(12) United States Patent
Lim et al.

(10) Patent No.: US 12,455,591 B2
(45) Date of Patent: Oct. 28, 2025

(54) DISPLAY DEVICE AND METHOD OF MANUFACTURING THE SAME

(71) Applicant: Samsung Display Co., Ltd., Yongin-si (KR)

(72) Inventors: Sungwook Lim, Yongin-si (KR); Jinhwan Kim, Yongin-si (KR); Yewon Cho, Yongin-si (KR); Sungtae Hwang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 188 days.

(21) Appl. No.: 18/125,207

(22) Filed: Mar. 23, 2023

(65) Prior Publication Data

US 2023/0393617 A1 Dec. 7, 2023

(30) Foreign Application Priority Data

Jun. 2, 2022 (KR) ........................ 10-2022-0067306

(51) Int. Cl.
| | |
|---|---|
| *B32B 3/02* | (2006.01) |
| *B32B 3/14* | (2006.01) |
| *B32B 3/30* | (2006.01) |
| *G06F 1/16* | (2006.01) |
| *H04M 1/02* | (2006.01) |

(52) U.S. Cl.
CPC .............. *G06F 1/1616* (2013.01); *B32B 3/02* (2013.01); *B32B 3/14* (2013.01); *B32B 3/30* (2013.01); *G06F 1/1652* (2013.01); *G06F 1/1656* (2013.01); *H04M 1/0222* (2013.01); *H04M 1/0268* (2013.01)

(58) Field of Classification Search
CPC .... B32B 3/00; B32B 3/02; B32B 3/10; B32B 3/14; B32B 3/22; B32B 3/26; B32B 3/263; B32B 3/266; B32B 3/30; G06F 1/1656
See application file for complete search history.

(56) References Cited

U.S. PATENT DOCUMENTS

| | | | |
|---|---|---|---|
| 9,095,931 B2 | 8/2015 | Morikazu | |
| 2019/0286192 A1* | 9/2019 | Cao | ........................ G06F 1/1688 |
| 2022/0320189 A1* | 10/2022 | Lee | ........................ H10K 59/123 |
| 2022/0328569 A1* | 10/2022 | Park | ........................ H10K 59/88 |
| 2024/0147814 A1* | 5/2024 | Yoo | ........................ H10K 59/873 |

FOREIGN PATENT DOCUMENTS

| | | | |
|---|---|---|---|
| CN | 112701142 | * | 4/2021 |
| KR | 10-2316369 | | 10/2021 |

* cited by examiner

*Primary Examiner* — Elizabeth E Mulvaney

(57) ABSTRACT

A method of manufacturing a display device, includes providing a preliminary display device including a display panel, a panel protective film disposed under the display panel, and protective films disposed under the panel protective film and on the display panel, irradiating a first laser beam to the preliminary display device from an upper or lower side of the preliminary display device to form a curved portion at a corner of the preliminary display device, irradiating a second laser beam to the preliminary display device in which the curved portion is formed to form a pattern portion in at least one protective film of the protective films in a direction in which the first laser beam is irradiated, and removing the at least one protective film in which the pattern portion is formed.

22 Claims, 21 Drawing Sheets

DISPLAY DEVICE AND METHOD OF MANUFACTURING THE SAME

CROSS-REFERENCE TO RELATED APPLICATION(S)

This U.S. non-provisional patent application claims priority to and benefits of Korean Patent Application No. 10-2022-0067306 under 35 U.S.C. § 119, filed on Jun. 2, 2022, in the Korean Intellectual Property Office (KIPO), the entire contents of which are incorporated herein by reference.

BACKGROUND

1. Technical Field

The disclosure relates to a display device including a curved portion and a method manufacturing the display device.

2. Description of the Related Art

A display device displays various images through a display screen to provide a user with information. In general, the display device displays the information in an allocated screen area. In recent years, flexible display devices including a flexible display panel that may be foldable or bendable are being developed. Different from a rigid display device, the flexible display device is foldable, rollable, and/or bendable. The flexible display device, which can be transformed into various shapes, is easy to carry and improves a user's convenience.

In general, a protective film is used in manufacturing the display device to prevent components of the display device from being damaged in manufacturing of the display device. The protective film may be removed after the components of the display device are processed, and thus, it is desirable for the protective film to have a low peeling force.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a display device having excellent reliability.

The disclosure provides a method of manufacturing a display device having improved reliability, which features a protective film more readily being removed during the manufacturing of the display device.

Embodiments of the disclosure provide a method of manufacturing a display device. The method may include providing a preliminary display device including a display panel, a panel protective film disposed under the display panel, and protective films disposed under the panel protective film and on the display panel, irradiating a first laser beam to the preliminary display device from an upper or lower side of the preliminary display device to form a curved portion at a corner of the preliminary display device, irradiating a second laser beam to the preliminary display device in which the curved portion is formed to form a pattern portion in at least one protective film of the protective films in a direction in which the first laser beam is irradiated, and removing the at least one protective film in which the pattern portion is formed.

The pattern portion may include a plurality of protruding portions each including an edge corresponding to an edge of the curved portion, and a plurality of openings defined between the plurality of protruding portions.

A portion of each of the plurality of protruding portions, which may be adjacent to a corresponding opening, may have a radius of curvature smaller than a radius of curvature of the curved portion in plan view.

Each of the plurality of openings may have a concave shape recessed to a direction away from the corner in plan view.

The irradiating of the first laser beam may include irradiating the first laser beam to the at least one protective film, which may be adjacent to the panel protective film, and the irradiating of the second laser beam may include substantially simultaneously patterning the panel protective film and the at least one protective film disposed on the panel protective film.

The patterned panel protective film may include a plurality of panel protruding portions, and a plurality of concave portions defined between the plurality of panel protruding portions.

Each of the concave portions may have a concave shape recessed to a direction away from the corner in plan view.

The at least one protective film may include a protective layer and an adhesive layer disposed between the display panel and the protective layer.

The display device may include a folding area folded with respect to a folding axis extending in a direction, a first non-folding area, and a second non-folding area spaced apart from the first non-folding area with the folding area interposed therebetween.

Embodiments of the disclosure provide a method of manufacturing a display device. The method may include providing a preliminary display device including a first protective film, a panel protective film disposed on the first protective film, a display panel disposed on the panel protective film, and a second protective film disposed on the display panel, irradiating a first laser beam toward the display panel from an upper side of the second protective film to form a curved portion at a corner of the preliminary display device, irradiating a second laser beam toward the display panel from the upper side of the second protective film to form a pattern portion adjacent to an edge of the curved portion of the second protective film, and removing the second protective film in which the pattern portion may be formed.

The pattern portion may include a plurality of protruding portions each including an edge corresponding to an edge of the curved portion, and a plurality of openings defined between the plurality of protruding portions.

Each of the protruding portions may include a portion having a radius of curvature smaller than a radius of curvature of the curved portion.

Each of the plurality of openings may have a concave shape recessed to a direction away from the corner in plan view.

The first protective film may include a first protective layer and a first adhesive layer disposed between the display panel and the first protective layer, and the second protective film may include a second protective layer and a second adhesive layer disposed between the second protective layer and the panel protective film.

The irradiating of the first laser beam may include entirely cutting the preliminary display device in a thickness direction, and the irradiating of the second laser beam may include cutting the second protective film in the thickness direction.

The irradiating of the second laser beam may include substantially simultaneously patterning the second protective film and the panel protective film.

Embodiments of the disclosure provide a display device that may include a plurality of curved portions disposed at a plurality of corners, a display panel, and a panel protective film disposed under the display panel and including a plurality of panel pattern portions adjacent to an edge of at least one curved portion among the curved portions. The plurality of panel pattern portions may include a plurality of panel protruding portions and a plurality of concave portions defined between the plurality of panel protruding portions. Each of the panel protruding portions may include a part with a radius of curvature smaller than a radius of curvature of the curved portion.

The plurality of panel protruding portions, which may be adjacent to the plurality of concave portions, may have a same radius of curvature.

An edge of each of the plurality of panel protruding portions may correspond to an edge of the display panel.

Each of the plurality of concave portions may have a concave shape recessed to a direction away from the corner in plan view.

The display panel may include a folding area folded with respect to a folding axis that is an imaginary line extending in a direction, a first non-folding area, and a second non-folding area spaced apart from the first non-folding area with the folding area interposed therebetween.

Each of the plurality of panel protruding portions may include a part being adjacent to the concave portion and having a radius of curvature smaller than a radius of curvature of the at least one curved portion.

According to the above, a protective film may be readily separated while effectively protecting the display device during a manufacturing method of the display device, and thus, reliability of the display device may be improved.

According to the above, a manufacturing method of the display device may include the forming of the pattern portion in the protective film at the portion adjacent to the edge of the curved portion. Thus, the peeling force of the protective film may be controlled, and the reliability of the display device may be improved.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION OF THE EMBODIMENTS

Figure 1A:
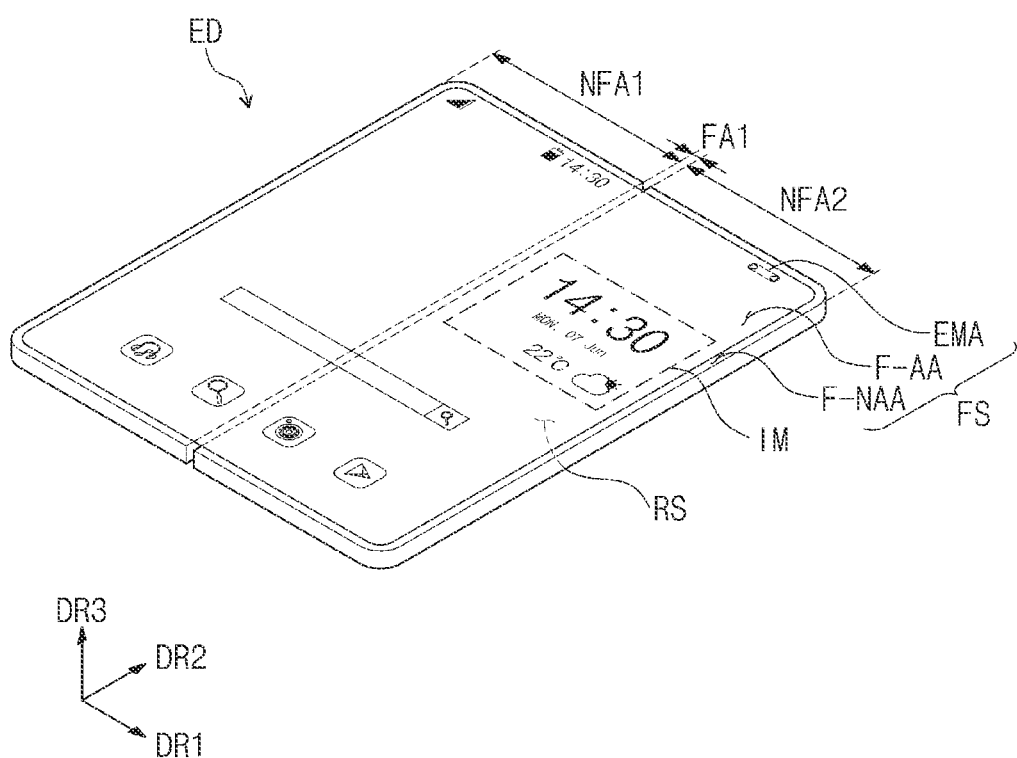
FIG. 1A is a schematic perspective view showing a display device in an unfolded state according to an embodiment of the disclosure.

The disclosure may be variously modified and realized in many different forms, and thus only certain specific embodiments will be disclosed in the drawings and described in detail hereinbelow. However, the disclosure should not be limited to the specific disclosed forms, and should be construed to include all modifications, equivalents, or replacements included in the spirit and scope of the disclosure.

In the disclosure, it will be understood that when an element (or area, layer, or portion) is referred to as being "on", "connected to" or "coupled to" another element or layer, it can be directly on, connected or coupled to the other element or layer or intervening elements or layers may be present.

When an element is referred to as being "directly disposed" on, connected to, or coupled to another element, there may be no intervening elements present. For example, the term "directly disposed" may mean that two layers or two members are disposed without employing additional adhesive therebetween.

Like numerals refer to like elements throughout. In the drawings, the thickness, ratio, and dimension of components may be exaggerated for effective description of technical content. As used herein, the term "and/or" may include any and all combinations of one or more of the associated listed items. For example, "A and/or B" may be understood to mean any combination including "A, B, or A and B." The terms "and" and "or" may be used in the conjunctive or disjunctive sense and may be understood to be equivalent to "and/or."

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

"About", "approximately", "substantially", and the like, as used herein are inclusive of the stated value and mean within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "comprise", "comprising", "have", "has", "include" and/or "including", when used in this specification, specify the presence of stated features, integers, steps, operations, elements, and/or components, but do not preclude the presence or addition of one or more other features, integers, steps, operations, elements, components, and/or groups thereof.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

Figure 1B:
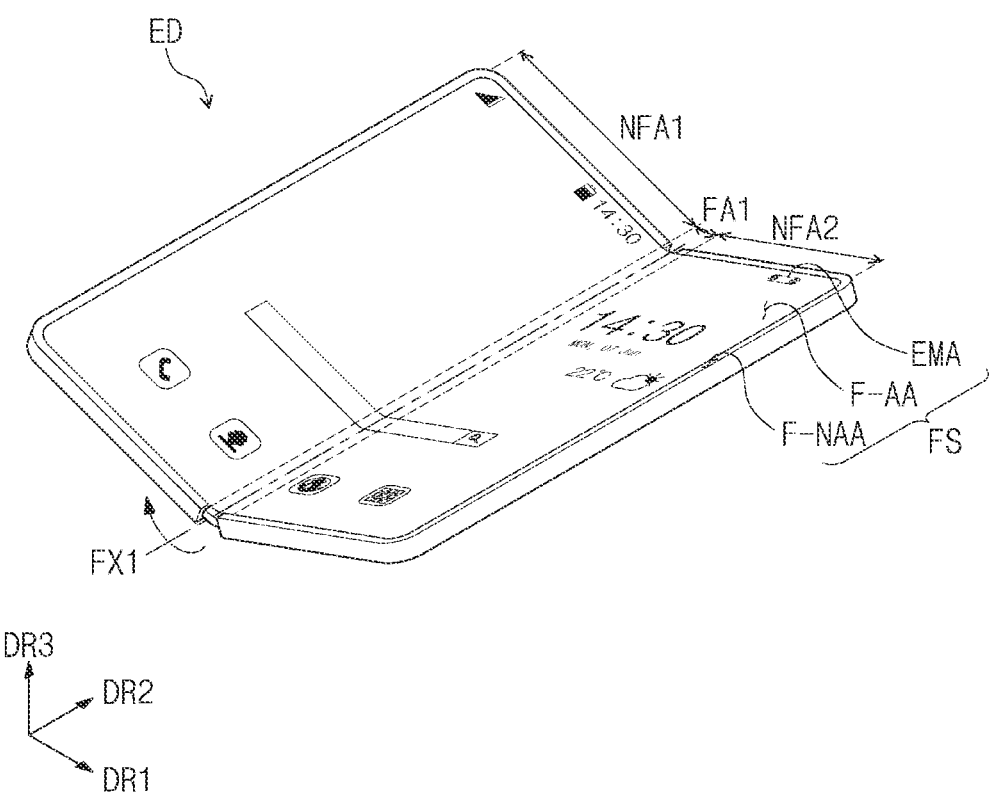
FIG. 1B is a schematic perspective view showing the display device of FIG. 1A which is being inwardly folded according to an embodiment of the disclosure.
Figure 1C:
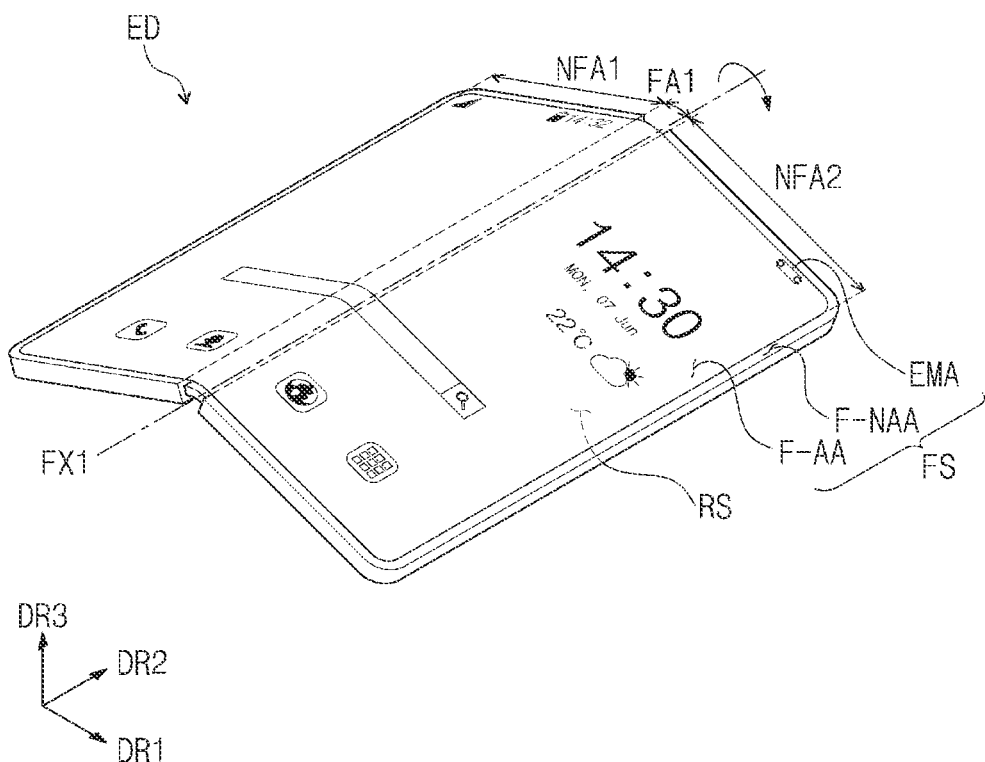
FIG. 1C is a schematic perspective view showing the display device of FIG. 1A which is being outwardly folded according to an embodiment of the disclosure.

FIG. 1A is a schematic perspective view showing a display device ED in an unfolded state according to an embodiment of the disclosure. FIG. 1B is a schematic perspective view showing the display device ED of FIG. 1A which is being inwardly folded according to an embodiment of the disclosure. FIG. 1C is a schematic perspective view showing the display device ED of FIG. 1A which is being outwardly folded according to an embodiment of the disclosure.

The display device ED may be a device that is activated in response to electrical signals. As an example, the display device ED may be a mobile phone, a tablet computer, a car navigation unit, a game unit, or a wearable device, however, it should not be limited thereto or thereby. FIG. 1A shows a mobile phone as a representative example of the display device ED.

Referring to FIGS. 1A to 1C, the display device ED may include a first display surface FS defined by a first directional axis DR1 and a second directional axis DR2 crossing the first directional axis DR1. The display device ED may provide an image IM to a user through the first display surface FS. The display device ED may display the image IM through the first display surface FS, which may be substantially parallel to each of the first directional axis DR1 and the second directional axis DR2, toward a third directional axis DR3. In the disclosure, front (or upper) and rear (or lower) surfaces of each member of the display device ED may be defined with respect to a direction in which the image IM may be displayed. The front and rear surfaces may be opposite to each other in the third directional axis DR3, and a normal line direction of each of the front and rear surfaces may be substantially parallel to the third directional axis DR3.

According to an embodiment, the display device ED may include the first display surface FS and a second display surface RS. The first display surface FS may include a first active area F-AA and a first peripheral area F-NAA. The first active area F-AA may include an electronic module area EMA. The second display surface RS may be opposite to at least a portion of the first display surface FS. For example, the second display surface RS may be defined as a portion of a rear surface of the display device ED.

The display device ED may sense an external input applied thereto from outside the display device ED. The external input may include various forms of inputs provided from outside the display device ED. As an example, the external inputs may include a proximity input (e.g., hovering) applied in case of approaching close to or adjacent to the display device ED at a predetermined or given distance as well as a touch input by a user's body (e.g., user's hand). The external inputs may be provided in the form of force, pressure, temperature, light, etc.

FIG. 1A and the following drawings show the first, second, and third directional axes DR1, DR2, and DR3, and directions indicated by the first, second, and third directional axes DR1, DR2, and DR3 may be relative to each other and may be changed to other directions. The directions indicated by the first, second, and third directional axes DR1, DR2, and DR3 may be referred to as first, second, and third directions, respectively, and may be assigned with the same reference numerals as those of the first, second, and third directional axes DR1, DR2, and DR3.

The first active area F-AA of the display device ED may be activated in response to the electrical signals. The display device ED may display the image IM through the first active area F-AA, and various external inputs may be sensed through the first active area F-AA. The first peripheral area F-NAA may be defined adjacent to the first active area F-AA. The first peripheral area F-NAA may have a predetermined or given color. The first peripheral area F-NAA may surround the first active area F-AA. Accordingly, the first active area F-AA may have a shape that is substantially defined by the first peripheral area F-NAA, however, this is merely an example. The first peripheral area F-NAA may be defined adjacent to only one side of the first active area F-AA or may be omitted. According to an embodiment, the display device ED may include an active area of various shapes, and it should not be particularly limited.

The display device ED may include a folding area FA1 and non-folding areas NFA1 and NFA2. The display device ED may include multiple non-folding areas NFA1 and NFA2. According to an embodiment, the non-folding areas NFA1 and NFA2 may be disposed adjacent to each other with the folding area FA1 interposed therebetween. According to an embodiment, the display device ED may include a first non-folding area NFA1 and a second non-folding area NFA2 spaced apart from the first non-folding area NFA1 with the folding area FA1 interposed therebetween in the first directional axis DR1. As an example, the first non-folding area NFA1 may be disposed adjacent to a side of the folding area FA1 in the first directional axis DR1, and the second non-folding area NFA2 may be disposed adjacent to another side of the folding area FA1 in the first directional axis DR1.

FIGS. 1A to 1C show the display device ED including one folding area FA1 as a representative example, however, the display device ED should not be limited thereto or thereby.

According to an embodiment, the display device ED may include multiple folding areas.

Referring to FIG. 1B, the display device ED may be folded with respect to a first folding axis FX1. The first folding axis FX1 may be an imaginary axis extending in the second directional axis DR2 to be substantially parallel to a direction in which a long side of the display device ED extends. The first folding axis FX1 may extend in the second directional axis DR2 on the first display surface FS.

The display device ED may be folded with respect to the first folding axis FX1 to be in the inwardly folded (in-folding) state where an area of the first display surface FS, which overlaps the first non-folding area NFA1, faces an area of the first display surface FS, which overlaps the second non-folding area NFA2.

The second display surface RS may be viewed by the user in case that the display device ED is in the inwardly folded state. The second display surface RS may further include the electronic module area EMA in which an electronic module including various components is disposed.

Referring to FIG. 1C, the display device ED may be folded with respect to the folding axis FX1 to be in an outwardly folded (out-folding) state where an area of the second display surface RS, which overlaps the first non-folding area NFA1, faces an area of the second display surface RS, which overlaps the second non-folding area NFA2.

However, the display device ED should not be limited thereto or thereby. The display device ED may be folded with respect to multiple folding axes such that a portion of the first display surface FS and a portion of the second display surface RS may face each other, and the number of the folding axes and the number of non-folding areas should not be particularly limited.

Various electronic modules may be disposed in the electronic module area EMA. As an example, the electronic module may include a camera, a speaker, an optical sensor, and/or a thermal sensor. An external object may be sensed through the electronic module area EMA of the first display surface FS or the second display surface RS, or a sound signal, such as a voice, may be provided to the outside through the electronic module area EMA of the first display surface FS or the second display surface RS. The electronic module may include multiple components, and it should not be limited to a particular embodiment.

The electronic module area EMA may be surrounded by the first active area F-AA and the first peripheral area F-NAA, however, it should not be limited thereto or thereby. The electronic module area EMA may be defined in the first active area F-AA, and the electronic module area EMA should not be particularly limited.

Figure 2A:
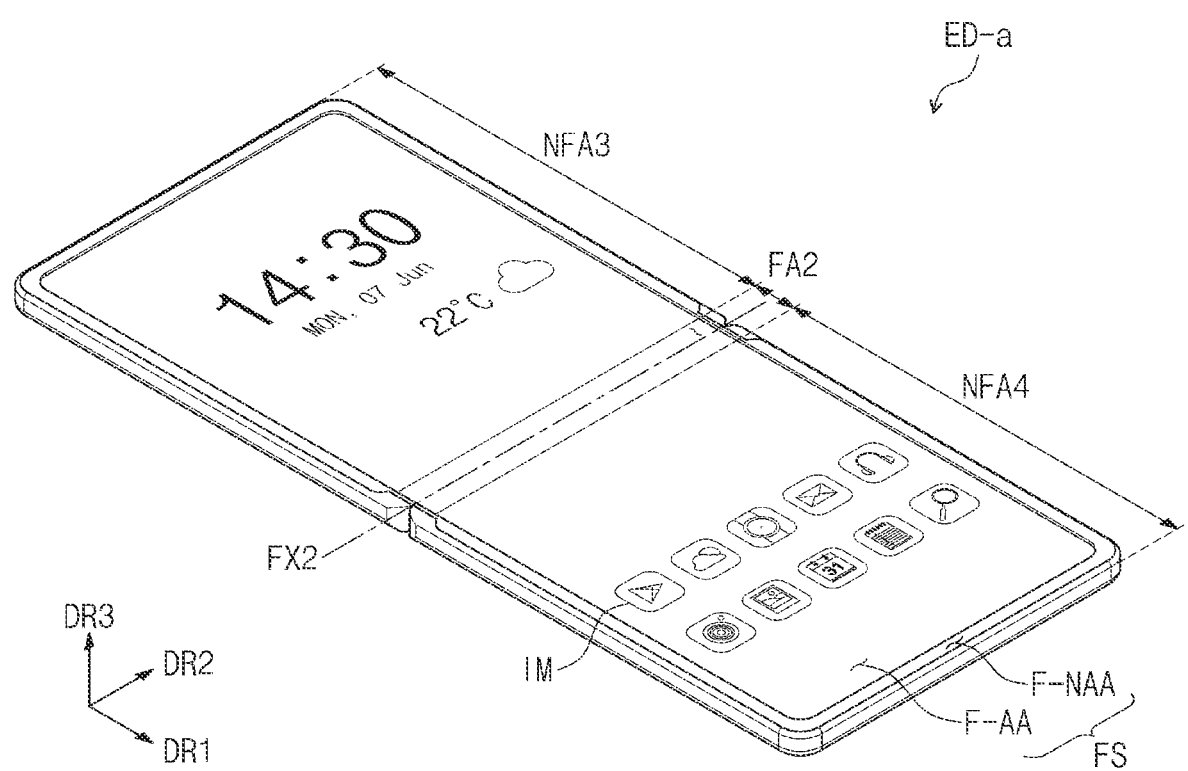
FIG. 2A is a schematic perspective view showing a display device in an unfolded state according to an embodiment of the disclosure.
Figure 2B:
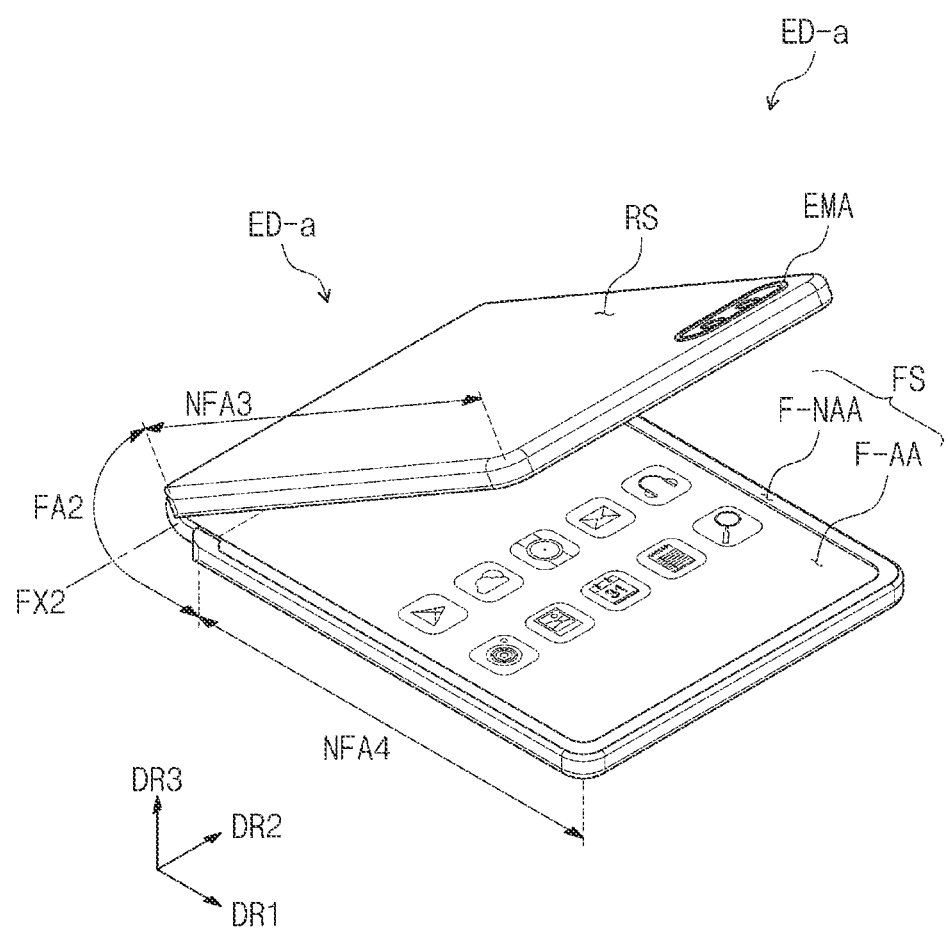
FIG. 2B is a schematic perspective view showing the display device of FIG. 2A which is being inwardly folded according to an embodiment of the disclosure.

FIG. 2A is a schematic perspective view showing a display device ED-a in an unfolded state according to an embodiment of the disclosure. FIG. 2B is a schematic perspective view showing the display device ED-a of FIG. 2A which is being inwardly folded according to an embodiment of the disclosure.

The display device ED-a may be folded with respect to a second folding axis FX2 extending in a direction substantially parallel to the second directional axis DR2. In FIG. 2B, the second folding axis FX2 extends substantially parallel to a direction in which a short side of the display device ED-a extends, however, it should not be limited thereto or thereby.

According to an embodiment, the display device ED-a may include at least one folding area FA2 and non-folding areas NFA3 and NFA4 defined adjacent to the folding area FA2. The non-folding areas NFA3 and NFA4 may be spaced apart from each other with the folding area FA2 interposed therebetween.

The folding area FA2 may have a predetermined or given curvature and a radius of curvature. According to an embodiment, the display device ED-a may be inwardly folded (in-folding) such that a first non-folding area NFA3 and a second non-folding area NFA4 may face each other and a first display surface FS may not be exposed to the outside.

Different from the embodiment shown in FIGS. 2A and 2B, the display device ED-a may be outwardly folded (out-folding) such that the first display surface FS may be exposed to the outside. The first display surface FS may be viewed by the user in the unfolded state of the display device ED-a, and a second display surface RS may be viewed by the user in the inwardly folded state. The second display surface RS may include an electronic module area EMA in which an electronic module including various components is disposed.

According to an embodiment, the display device ED-a may include the second display surface RS, and the second display surface RS may be defined as a surface opposite to at least a portion of the first display surface FS. In the inwardly folded (in-folding) state of the display device ED-a, the second display surface RS may be viewed by the user. The second display surface RS may include the electronic module area EMA in which the electronic module including various components is disposed. According to an embodiment, the image may be provided through the second display surface RS.

The display devices ED and ED-a may repeat the unfolding operation and the in-folding operation or to repeat the unfolding operation and the out-folding operation, however, the disclosure should not be limited thereto or thereby. According to an embodiment, the display devices ED and ED-a may be selectively operated in any one of the unfolding operation, the in-folding operation, and the out-folding operation.

Figure 3:
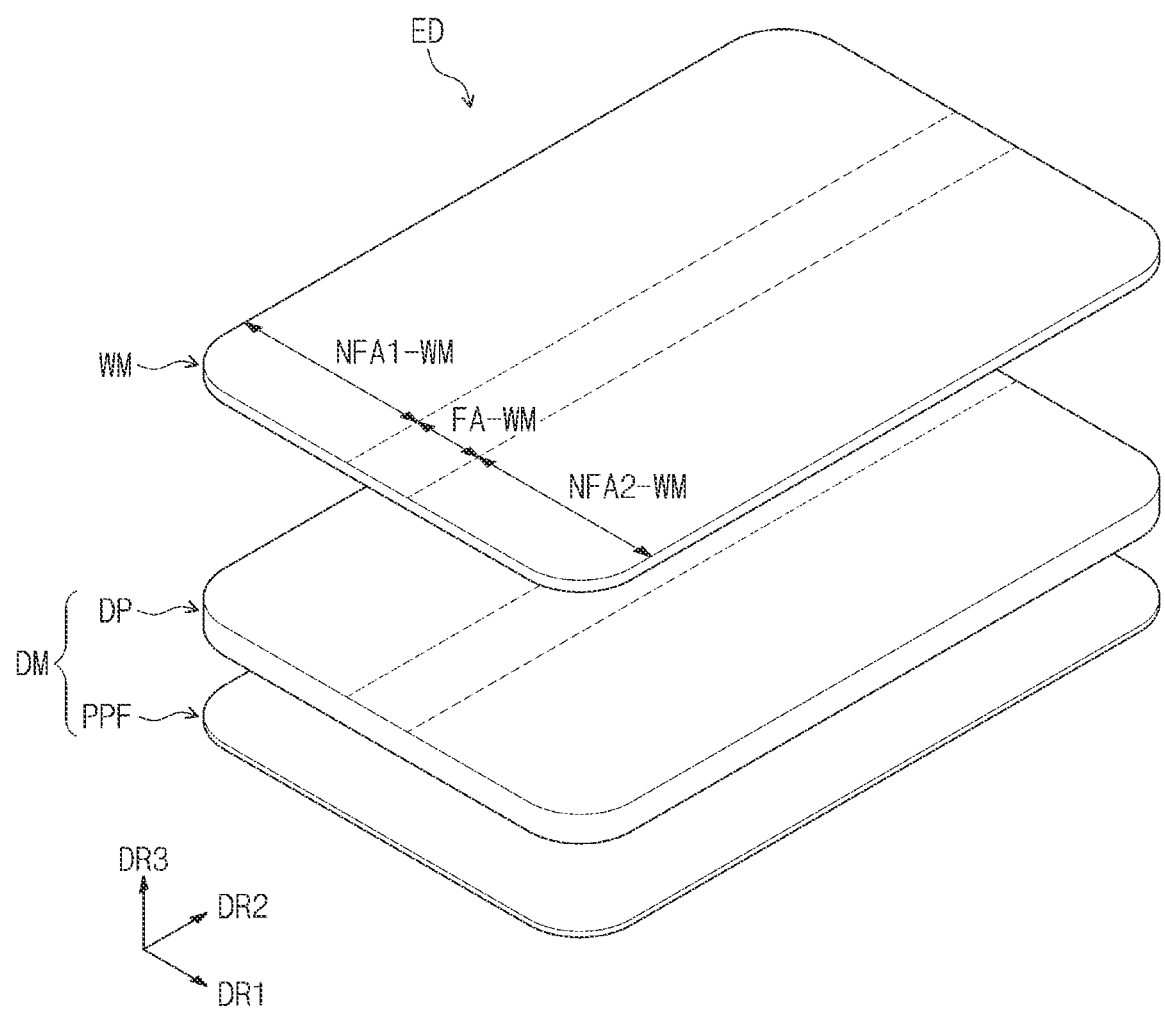
FIG. 3 is an exploded schematic perspective view showing a display device according to an embodiment of the disclosure.

FIG. 3 is an exploded schematic perspective view showing the display device ED according to an embodiment of the disclosure. Referring to FIG. 3, the display device ED may include a display module DM and a window WM disposed on the display module DM. The display module DM may include a display panel DP and a panel protective film PPF disposed under the display panel DP.

The window WM may include a window folding portion FA-WM and window non-folding portions NFA1-WM and NFA2-WM. The window folding portion FA-WM may be referred to as a folding portion, and the window non-folding portions NFA1-WM and NFA2-WM may be referred to as non-folding portions. A first non-folding portion NFA1-WM and a second non-folding portion NFA2-WM of the window WM may be spaced apart from each other with the folding portion FA-WM interposed therebetween. The folding portion FA-WM may correspond to the folding area FA1 (refer to FIG. 1A), and the non-folding portions NFA1-WM and NFA2-WM may correspond to the non-folding areas NFA1 and NFA2 (refer to FIG. 1A), respectively.

In the display device ED according to the embodiment, the window WM may cover an entire outer portion of the display module DM. The window WM may have a shape corresponding to a shape of the display module DM.

The display panel DP may include a display element layer. For instance, the display element layer may include an organic electroluminescent element, a quantum dot light emitting element, or a liquid crystal element, however, the embodiment should not be limited thereto or thereby.

Figure 4:
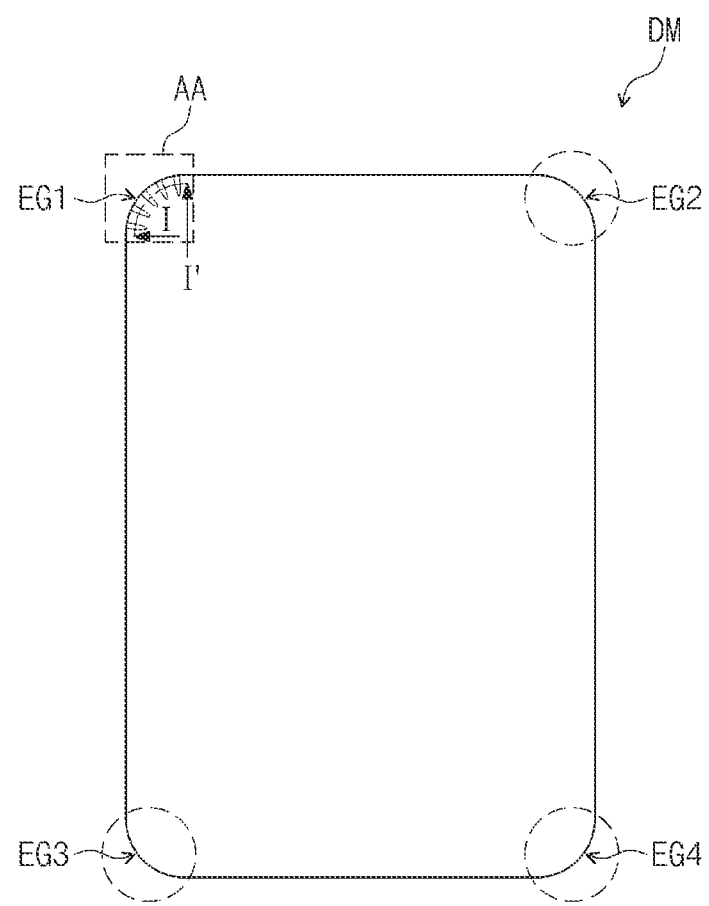
FIG. 4 is a schematic plan view of a display module according to an embodiment of the disclosure.
Figure 5A:
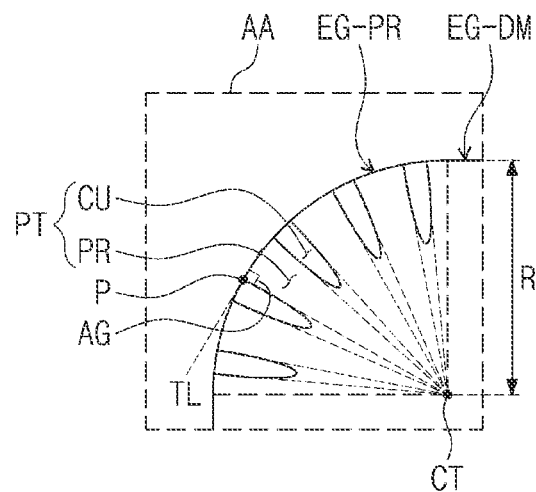
FIG. 5A is an enlarged schematic plan view of a portion of a display module according to an embodiment of the disclosure.
Figure 5B:
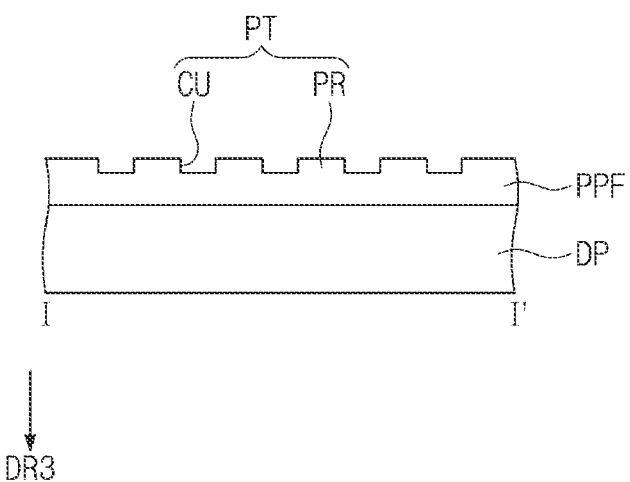
FIG. 5B is a schematic cross-sectional view of a portion of a display module according to an embodiment of the disclosure.

FIG. 4 is a schematic plan view of the display module DM according to an embodiment of the disclosure. FIG. 5A is an enlarged schematic plan view of a portion AA of the display module DM according to an embodiment of the disclosure. FIG. 5B is a schematic cross-sectional view of a portion of the display module DM according to an embodiment of the disclosure. FIGS. 4 and 5A are views of the display module DM shown in FIG. 3 when viewed from the panel protective film PPF. FIG. 5B is a cross-sectional view taken along line I-I' of FIG. 4.

Referring to FIGS. 4 to 5B, the display module DM may include four corners EG1 to EG4. Each of the four corners EG1 to EG4 may include a curved portion. For example, the display module DM may include four curved portions. The curved portion may have a predetermined or given radius of curvature R with respect to a center of curvature CT.

The panel protective film PPF may include multiple panel pattern portions PT adjacent to an edge EG-DM of at least one curved portion among the curved portions. FIG. 4 shows the panel pattern portions PT defined adjacent to the edge EG-DM of one curved portion, however, the disclosure should not be limited thereto or thereby. As an example, the panel protective film PPF may include multiple panel pattern portions PT defined adjacent to an edge EG-DM of each of two or more curved portions.

The panel pattern portions PT may include multiple panel protruding portions PR and multiple concave portions CU. An edge EG-PR of each of the panel protruding portions PR may correspond to the edge EG-DM of the curved portion. The concave portions CU may be disposed between the panel protruding portions PR.

Each of the panel protruding portions PR may include a portion that has a radius of curvature smaller than a radius of curvature R of the curved portion. A portion P (part), which is adjacent to the concave portion CU, of each of the panel protruding portions PR may have a radius of curvature smaller than the radius of curvature R of the curved portion. An angle AG between a tangent line TL at the portion P of the panel protruding portion PR, which is adjacent to the concave portion CU, and the concave portion CU may be about 90 degrees. Accordingly, the radius of curvature of the portion P of the panel protruding portion PR, which is adjacent to the concave portion CU, may be converged to zero (0), however, this is merely an example. According to an embodiment, under the condition that the radius of curvature of the portion P of the panel protruding portion PR, which is adjacent to the concave portion CU, is smaller than the radius of curvature R of the curved portion, the angle AG between the tangent line TL at the portion P of the panel protruding portion PR, which is adjacent to the concave portion CU, and the concave portion CU may be smaller than about 90 degrees.

Portions, which are adjacent to the concave portions CU, of the panel protruding portions PR may have substantially the same radius of curvature, however, this is merely an example, and the embodiment should not be limited thereto or thereby. As an example, the portion of at least one panel protruding portion PR among the panel protruding portions may have a radius of curvature different from that of the portion of other panel protruding portions PR.

When viewed in a plane substantially parallel to an upper surface of the display panel DP (in plan view), the concave portion CU may have a shape recessed to a direction away from the corner EG1. The concave portion CU may have a semi-oval shape in plan view, however, this is merely an example, and the shape of the concave portion CU should not be limited thereto or thereby. As an example, the concave portion CU may have a variety of shapes as long as the radius of curvature of the portion P of the panel protruding portion PR, which is adjacent to the concave portion CU, is smaller than the radius of curvature R of the curved portion.

FIGS. 4 and 5B show a structure in which the panel pattern portions PT include six panel protruding portions PR and five concave portions CU, however, the disclosure should not be limited thereto or thereby. The depth and shape of the concave portion CU in cross-sectional view shown in FIG. 5B are merely examples, and the embodiment should not be limited thereto.

The panel protective film PPF may include the panel pattern portion PT and may include portions with different thicknesses from each other. In detail, the portion of the panel protective film PPF, which corresponds to the panel protruding portion PR, may have the thickness greater than that of the portion of the panel protective film PPF, which corresponds to the concave portion CU.

Hereinafter, a method of manufacturing the display device will be described in detail. Features of the display device described with reference to FIGS. 1 to 5B will not be repeated again, and descriptions will be focused on the method of manufacturing the display device.

Figure 6A:
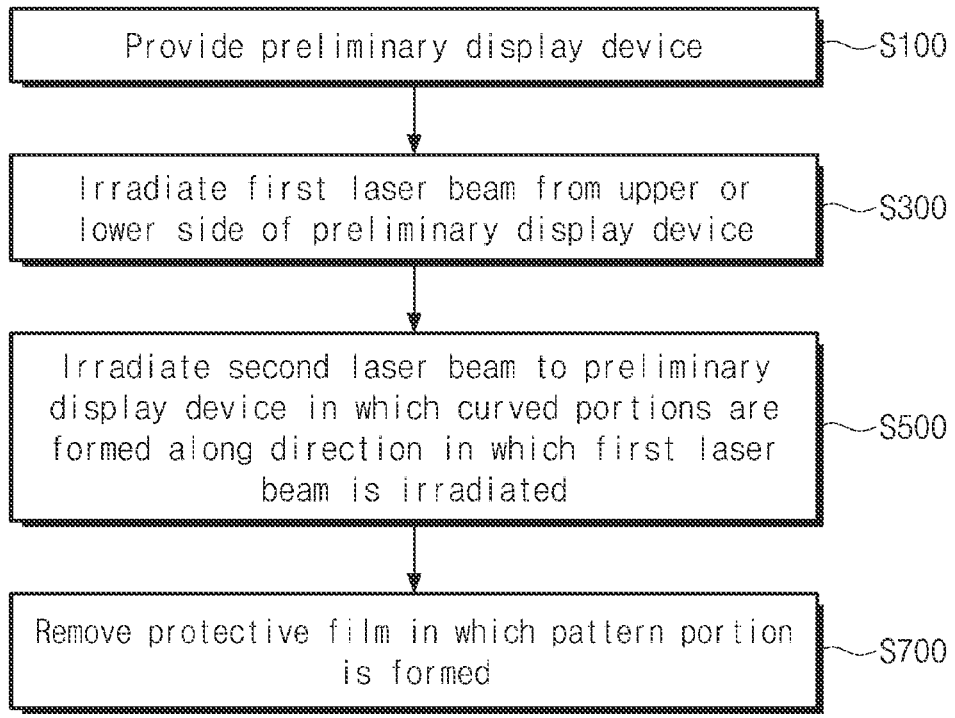
FIGS. 6A and 6B are schematic flowcharts of a method of manufacturing a display device according to embodiments of the disclosure.
Figure 6B:
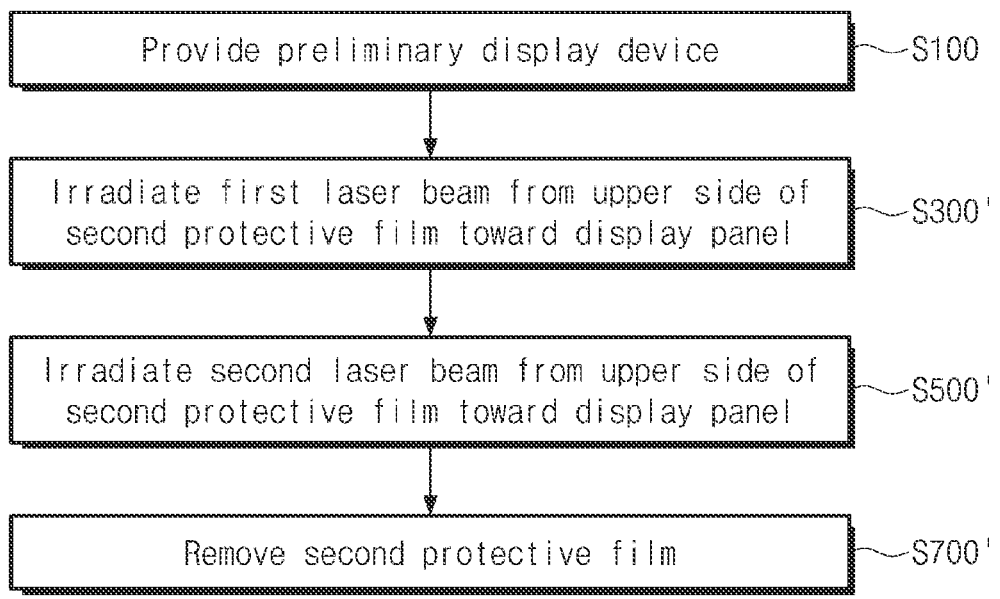

FIGS. 6A and 6B are schematic flowcharts of a manufacturing method of the display device according to embodiments of the disclosure. FIGS. 7A to 14 are schematic views of a manufacturing method of the display device according to an embodiment of the disclosure.

Referring to FIG. 6A, a manufacturing method of the display device may include providing a preliminary display device (S100), irradiating a first laser beam from an upper or lower side of the preliminary display device (S300), irradiating a second laser beam along a direction in which the first laser beam is irradiated to the preliminary display device in which the curved portion may be formed (S500), and removing a protective film in which the pattern portion may be formed (S700). Referring to FIG. 6B, a manufacturing method of the display device may include providing a preliminary display device (S100), irradiating a first laser beam second to the display panel from an upper side of a second protective film (S300'), irradiating a second laser beam to the display panel from the upper side of the second protective film (S500'), and removing the second protective film (S700').

Figure 7A:
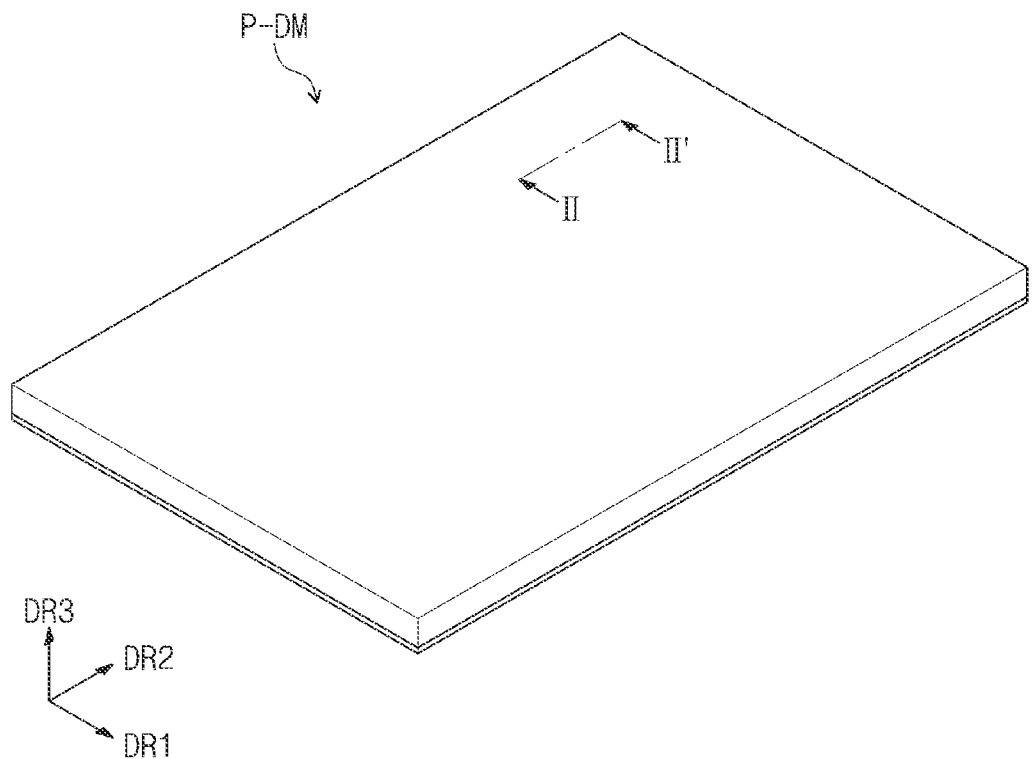
FIGS. 7A to 14 are schematic views of a method of manufacturing a display device according to an embodiment of the disclosure.
Figure 7B:
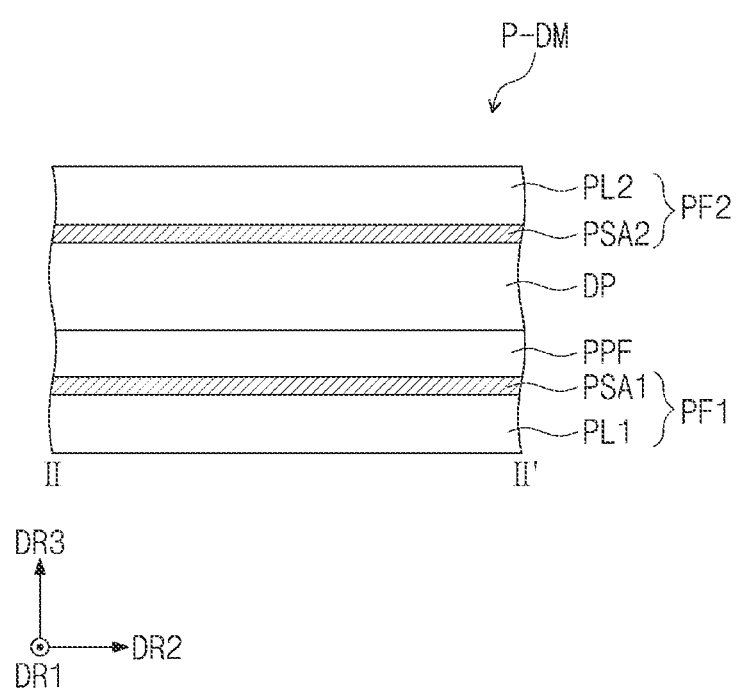

FIG. 7A shows the providing of the preliminary display device (S100). FIG. 7B is a cross-sectional view of the preliminary display device. FIG. 7B is a cross-sectional view taken along line II-II' of FIG. 7A.

Referring to FIGS. 7A and 7B, the preliminary display device P-DM may include a first protective film PF1, the panel protective film PPF, the display panel DP, and the second protective film PF2. The panel protective film PPF may be disposed under the display panel DP. The protective films PF1 and PF2 may be respectively disposed under the panel protective film PPF and on the display panel DP. The protective films PF1 and PF2 may include protective layers PL1 and PL2 and adhesive layers PSA1 and PSA2. The protective films PF1 and PF2 may prevent the panel protective film PPF and the display panel DP from being damaged during the processing of the preliminary display device P-DM.

The protective films PF1 and PF2 may include the first protective film PF1 disposed under the panel protective film PPF and the second protective film PF2 disposed on the display panel DP. The first protective film PF1 may include the protective layer PL1 and a first adhesive layer PSA1 disposed between the protective layer PL1 and the panel protective film PPF. The second protective film PF2 may include the protective layer PL2 and a second adhesive layer PSA2 disposed between the protective layer PL2 and the display panel DP.

Figure 8A:
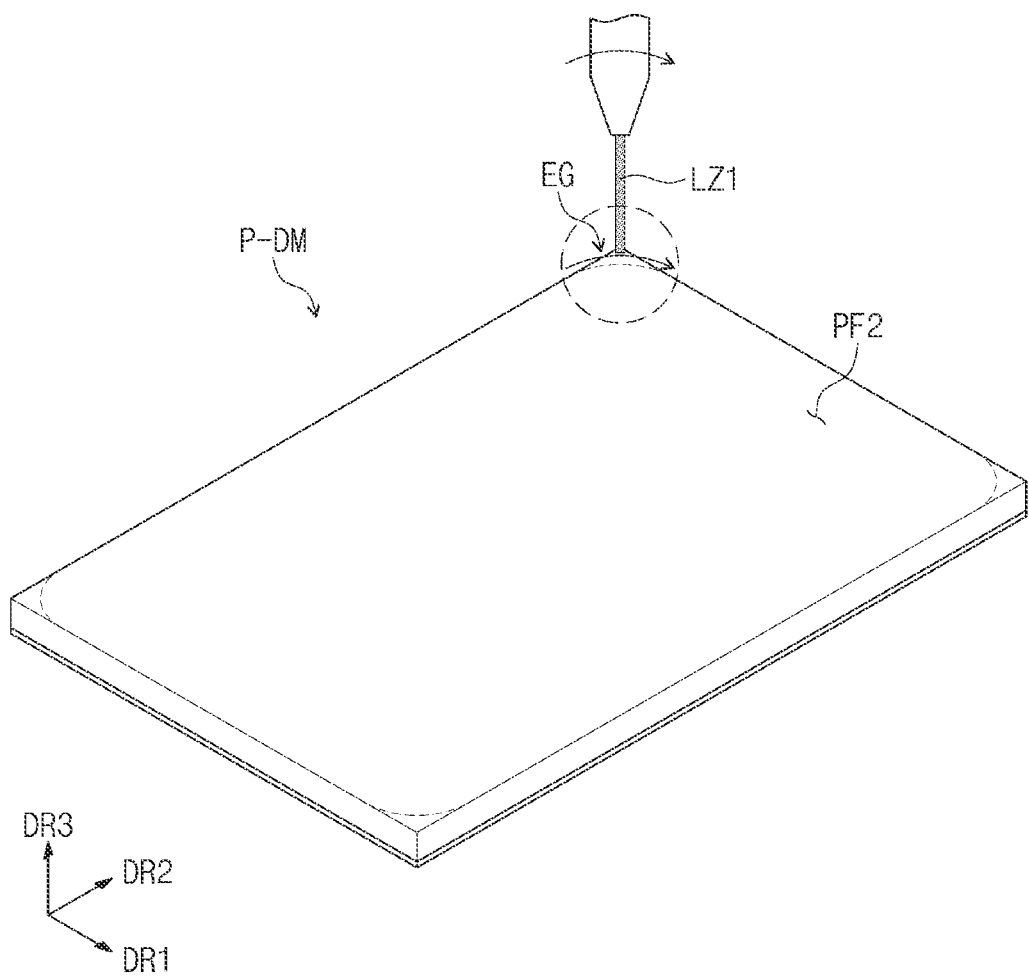
Figure 8B:
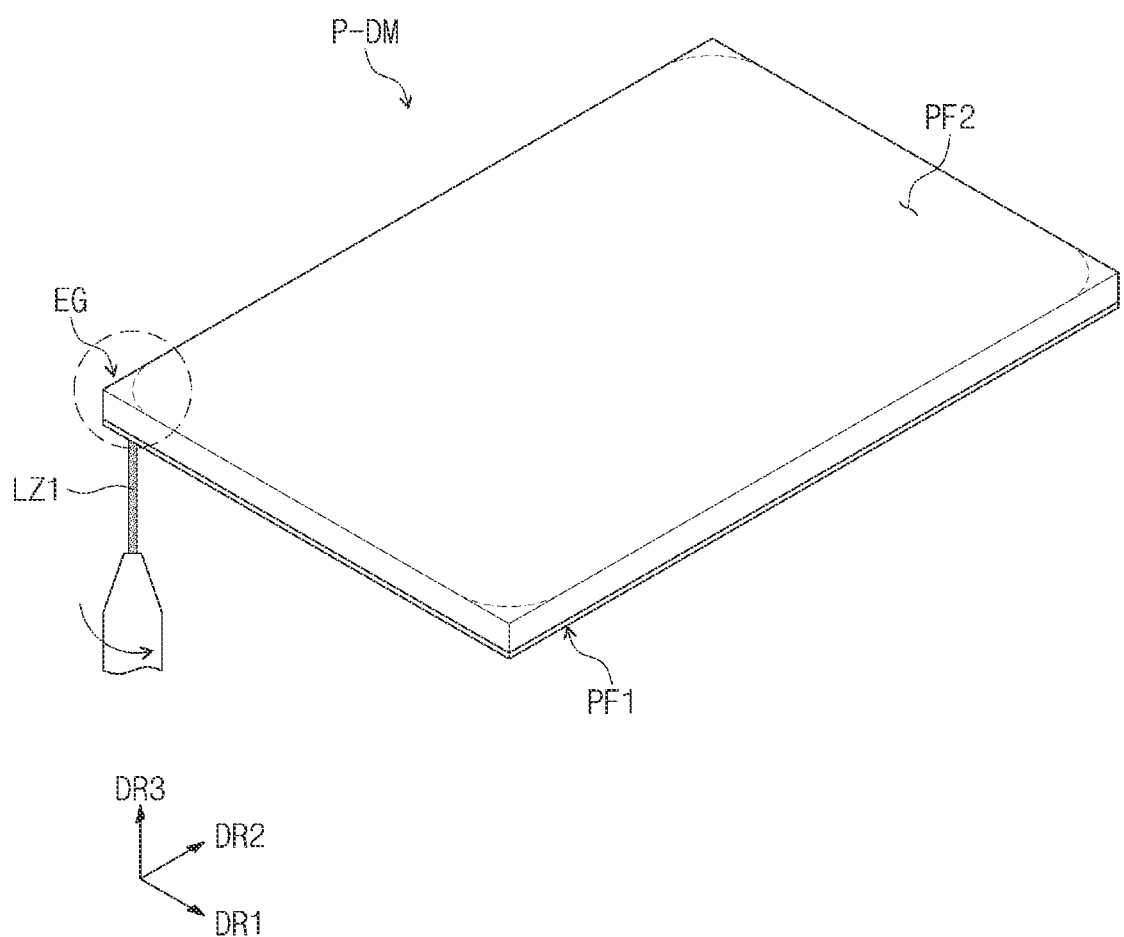

FIG. 8A shows the irradiating of the first laser beam from the upper side of the preliminary display device. FIG. 8B shows the irradiating of the first laser beam from the lower side of the preliminary display device.

Referring to FIGS. 8A and 8B, a manufacturing method of the display device may include the irradiating of the first laser beam LZ1 from the upper or lower side of the preliminary display device P-DM. In detail, a manufacturing method of the display device may include the irradiating of the first laser beam LZ1 to the display panel DP (refer to FIG. 7B) from the lower side of the first protective film PF1 or the irradiating of the first laser beam LZ1 to the display panel DP (refer to FIG. 7B) from the upper side of the second protective film PF2.

Referring to FIG. 8A, the irradiating of the first laser beam LZ1 from the upper side of the preliminary display device P-DM (S300) may include irradiating the first laser beam LZ1 from the upper side of the second protective film PF2. Referring to FIG. 8B, the irradiating of the first laser beam LZ1 from the lower side of the preliminary display device P-DM (S300) may include irradiating the first laser beam LZ1 from the lower side of the first protective film PF1.

Referring to FIGS. 8A and 8B, the preliminary display device P-DM may be entirely cut in the thickness direction by the irradiating of the first laser beam LZ1. The irradiating of the first laser beam LZ1 may include forming the curved portion at the corner EG of the preliminary display device P-DM. The curved portion formed in the preliminary display device P-DM may have the radius of curvature R with respect to the center of curvature CT (refer to FIG. 5A).

Figure 9A:
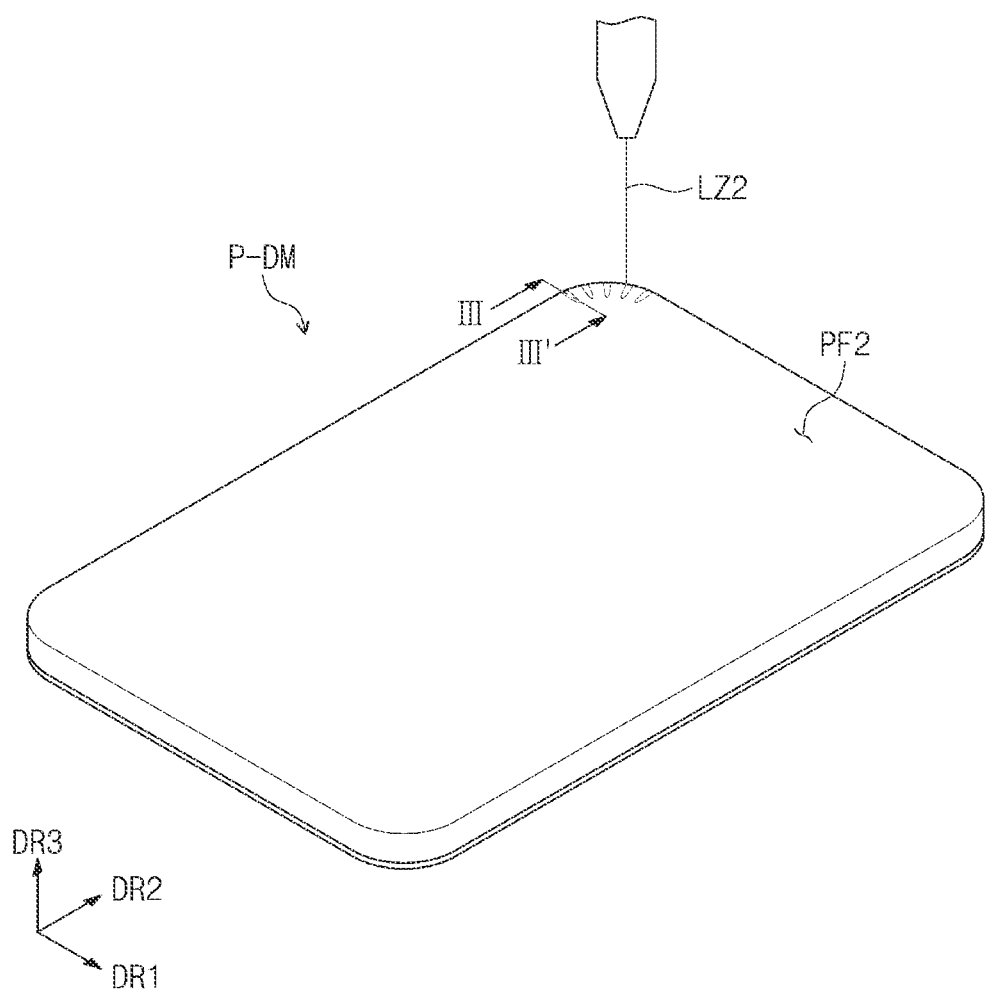
Figure 9B:
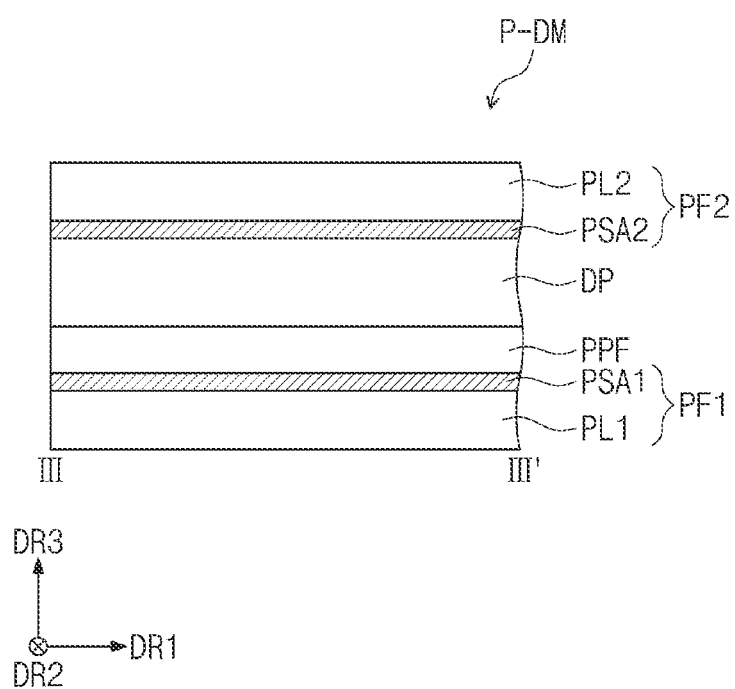

FIG. 9A is a view showing the irradiating of the second laser beam to the preliminary display device in which the curved portion may be formed along a direction in which the first laser beam may be irradiated. FIG. 9B is a cross-sectional view of the preliminary display device to which the first laser beam is irradiated. FIG. 9A shows the case where the second laser beam is irradiated to the preliminary display device P-DM from the upper side of the preliminary display device P-DM. FIG. 9B is a cross-sectional view taken along line III-III' of FIG. 9A.

Referring to FIGS. 9A and 9B, the irradiating of the second laser beam LZ2 to the preliminary display device P-DM in which the curved portion may be formed along the direction in which the first laser beam LZ1 (refer to FIG. 8A) is irradiated (hereinafter, referred to as "the irradiating of the second laser beam") may include the irradiating of the second laser beam LZ2 to the preliminary display device P-DM from the upper side of the preliminary display device P-DM. The irradiating of the second laser beam LZ2 may include the cutting of the second protective film PF2 in the thickness direction. As an example, the second laser beam LZ2 may be irradiated from the upper side of the second protective film PF2. The irradiating of the second laser beam LZ2 may include forming a second pattern portion PT2 (refer to FIG. 11B) in the second protective film PF2. The irradiating of the second laser beam LZ2 may include removing portions of the second protective film PF2 to form the second pattern portion PT2 (refer to FIG. 11B) in the second protective film PF2.

In the case where the first laser beam LZ1 (refer to FIG. 8A) is irradiated from the upper side of the preliminary display device P-DM, a fusion may occur between the second adhesive layer PSA2 and the display panel DP. In case that the fusion occurs between the second adhesive layer PSA2 and the display panel DP, an adhesion between the second protective film PF2 and the display panel DP may increase. Accordingly, in case that the second protective film PF2 is removed from the display panel DP, the display panel DP may be damaged.

Since a manufacturing method of the display device includes the irradiating of the second laser beam LZ2, the adhesion between the second adhesive layer PSA2 and the display panel DP, which is caused by the fusion, may be reduced. In detail, as the second laser beam LZ2 is irradiated to form the second pattern portion PT2 (refer to FIG. 11B) on the second protective film PF2, an area of the second protective film PF2 attached to the display panel DP may be reduced, and thus, the adhesion between the second protective film PF2 and the display panel DP may be reduced. The second pattern portion PT2 (refer to FIG. 11B) will be described in detail with reference to FIGS. 11A to 11C.

Figure 10A:
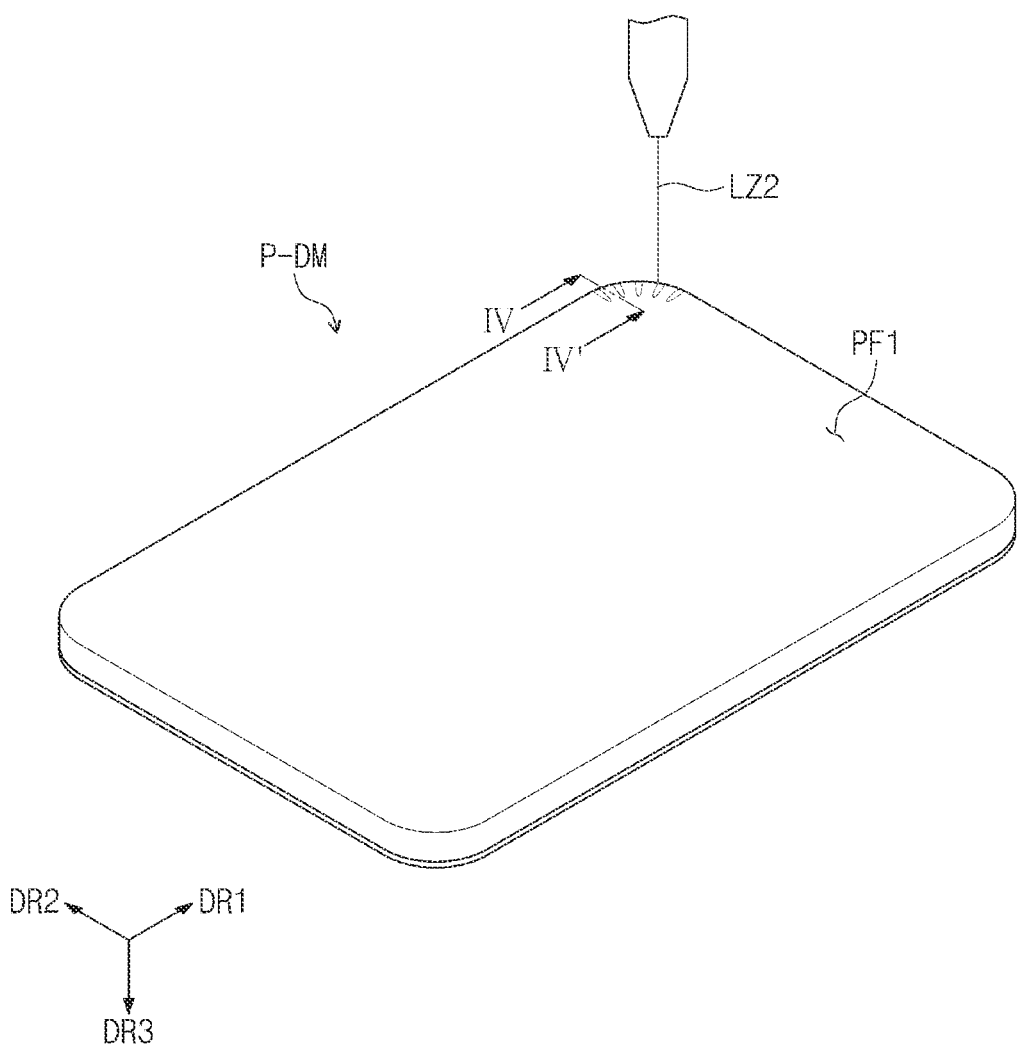
Figure 10B:
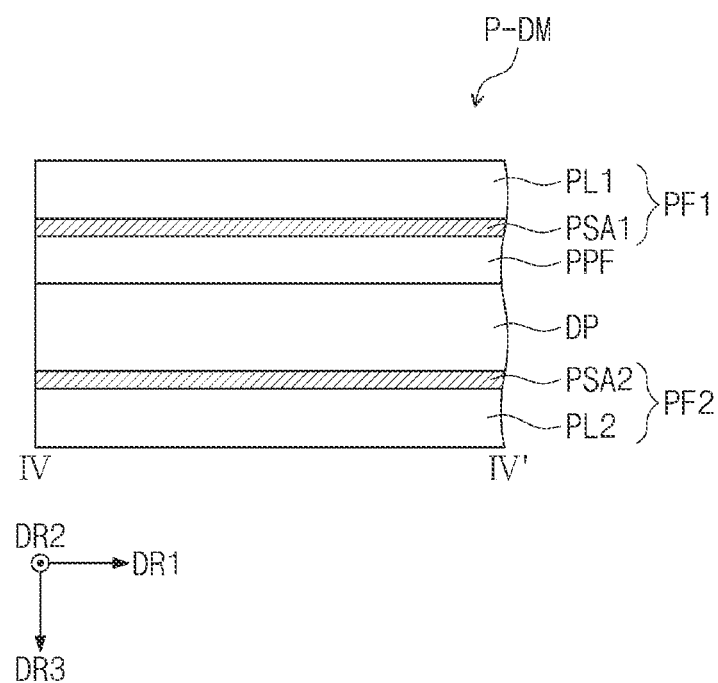

FIG. 10A is a view showing the irradiating of the second laser beam to the preliminary display device in which the curved portion may be formed along a direction in which the first laser beam is irradiated. FIG. 10B is a cross-sectional view of the preliminary display device to which the first laser beam may be irradiated. FIG. 10A shows the second laser beam irradiated to the preliminary display device P-DM from the lower side of the preliminary display device P-DM. FIG. 10B is a cross-sectional view taken along line IV-IV' of FIG. 10A.

Referring to FIGS. 10A and 10B, the irradiating of the second laser beam LZ2 to the preliminary display device P-DM in which the curved portion may be formed along the direction in which the first laser beam LZ1 (refer to FIG. 8B) is irradiated (hereinafter, referred to as "the irradiating of the second laser beam") may include the irradiating of the second laser beam LZ2 to the preliminary display device P-DM from the lower side of the preliminary display device P-DM. The irradiating of the second laser beam LZ2 may include the cutting of the first protective film PF1 in the thickness direction. As an example, the second laser beam LZ2 may be irradiated from the upper side of the first protective film PF1. The irradiating of the second laser beam LZ2 may include forming a first pattern portion PT1 (refer to FIG. 12B) in the first protective film PF1. The irradiating of the second laser beam LZ2 may include removing portions of the first protective film PF1 to form the first pattern portion PT1 (refer to FIG. 12B) in the first protective film PF1.

In the case where the first laser beam LZ1 (refer to FIG. 8B) is irradiated from the lower side of the preliminary display device P-DM, a fusion may occur between the first adhesive layer PSA1 and the panel protective film PPF. In case that the fusion occurs between the first adhesive layer PSA1 and the panel protective film PPF, an adhesion between the first adhesive layer PSA1 and the panel protective film PPF may increase. Accordingly, in case that the second protective film PF2 is removed from the panel protective film PPF, the panel protective film PPF may be damaged.

Since a manufacturing method of the display device includes the irradiating of the second laser beam LZ2, the adhesion between the first adhesive layer PSA1 and the panel protective film PPF, which is caused by the fusion, may be reduced. In detail, as the second laser beam LZ2 is irradiated to form the first pattern portion PT1 (refer to FIG. 12B) in the first protective film PF1, an area of the first protective film PF1 attached to the panel protective film PPF may be reduced, and thus, the adhesion between the first protective film PF1 and the panel protective film PPF may be reduced. The first pattern portion PT1 (refer to FIG. 11B) will be described in detail with reference to FIGS. 12A to 12C.

Figure 11A:
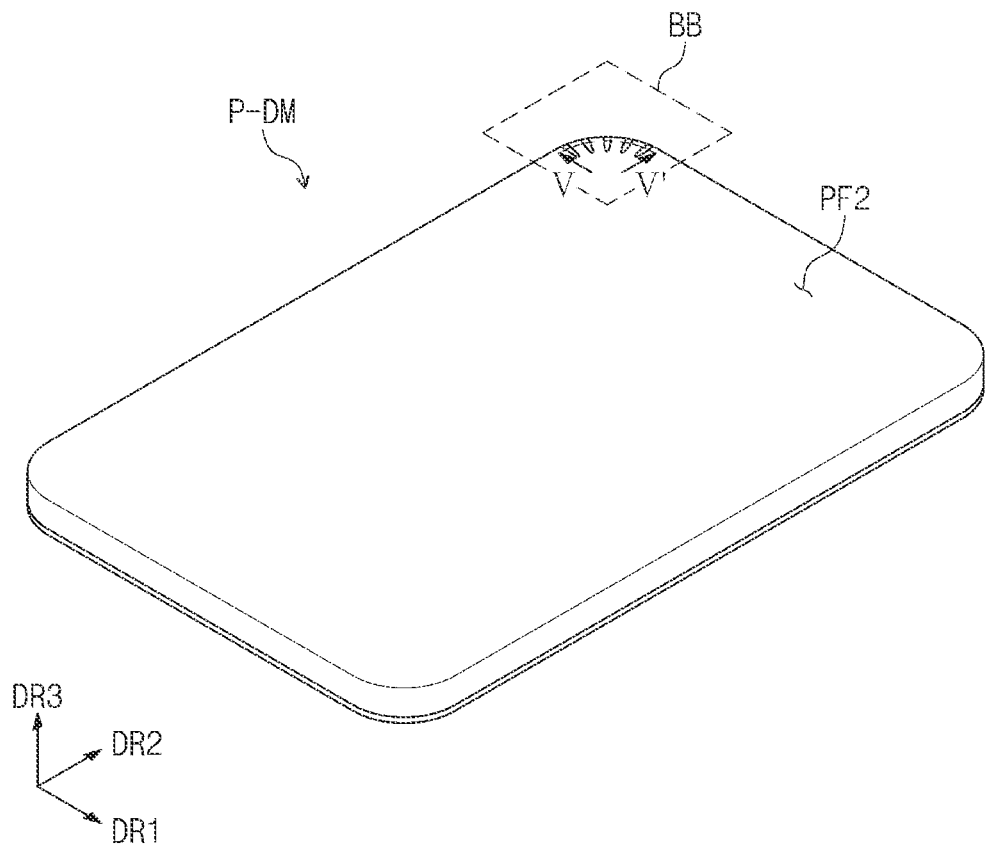
Figure 11B:
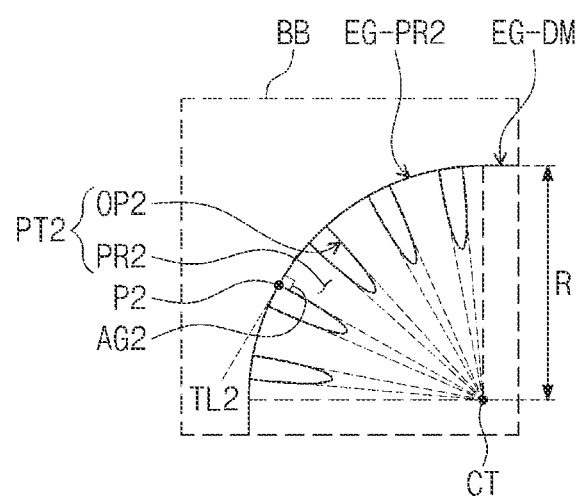
Figure 11C:
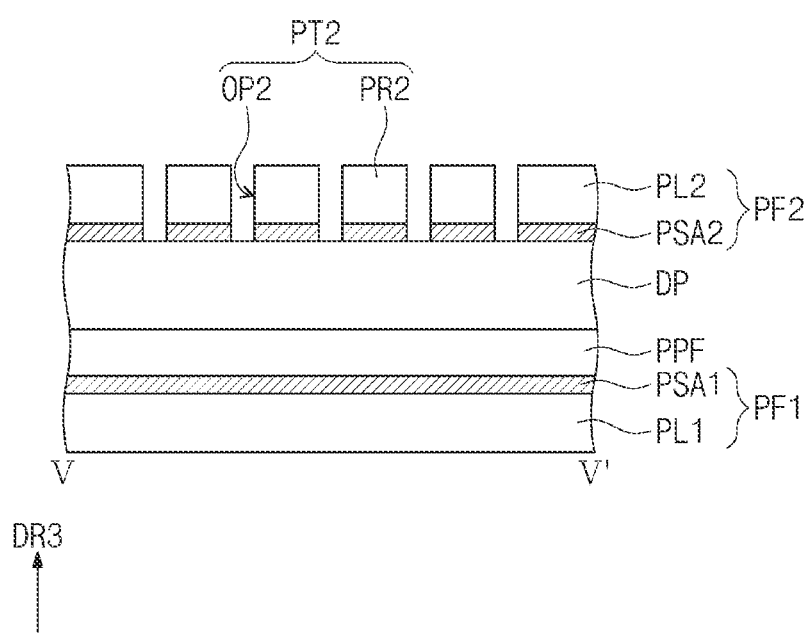

FIG. 11A is a perspective view of the preliminary display device including the second protective film in which the second pattern portion may be formed. FIG. 11B is an enlarged view of the preliminary display device including the second protective film in which the second pattern portion may be formed. FIG. 11C is a cross-sectional view of the preliminary display device including the second protective film in which the second pattern portion may be formed. FIG. 11B is an enlarged view of a portion BB shown in FIG. 11A. FIG. 11C is a cross-sectional view taken along line V-V' shown in FIG. 11A.

Referring to FIGS. 11A to 11C, the second protective film PF2 may include the second pattern portion PT2 formed adjacent to the edge EG-DM of the curved portion. The second protective film PF2 may include the plural second pattern portions PT2 adjacent to the edge EG-DM of at least one curved portion among the curved portions. FIG. 11A shows the structure in which the second protective film PF2 includes the plural second pattern portions PT2 adjacent to the edge EG-DM of the one curved portion, however, the disclosure should not be limited thereto or thereby. As an example, according to an embodiment, the second protective film PF2 may include the second pattern portions PT2 formed adjacent to the edge EG-DM of each of two or more curved portions.

The second pattern portions PT2 may include multiple second protruding portions PR2 and multiple second openings OP2. An edge EG-PR of each of the second protruding portions PR2 may correspond to the edge EG-DM of the curved portion. The second openings OP2 may be respectively defined between the second protruding portions PR2.

Each of the second protruding portions PR2 may include a portion that has the radius of curvature smaller than the radius of curvature R of the curved portion. The second protruding portions PR2 may include a portion P2 adjacent to the second opening OP2 and having the radius of curvature smaller than the radius of curvature R of the curved portion. For example, an angle AG2 between a tangent line TL2 of the portion P2 of the second protruding portion PR2, which is adjacent to the second opening OP2, and the second opening OP2 may be about 90 degrees. Accordingly, the radius of curvature of the portion P2 of the second protruding portion PR2, which is adjacent to the second opening OP2, may be converged to zero (0). However, this is merely an example, and the disclosure should not be limited thereto or thereby. As an example, under the condition that the radius of curvature of the portion P2 of the second protruding portion PR2, which is adjacent to the second opening OP2, is smaller than the radius of curvature R of the curved portion, the angle AG2 between the tangent line TL2 at the portion P2 of the second protruding portion PR2, which is adjacent to the second opening OP2, and the second opening OP2 may be smaller than about 90 degrees.

According to a manufacturing method of the display device, the second protruding portions PR2 may be formed such that the radius of curvature of the portion P2 adjacent to the second opening OP2 is smaller than the radius of curvature R of the curved portion, and thus, the adhesion of the second protective film PF2 may be reduced. Accordingly, the display panel DP may be prevented from being damaged in the removing of the second protective film PF2.

The second protruding portions PR2 may be formed such that radii of curvature of the portions P2 respectively adjacent to the second openings OP2 may be the same as each other. However, this is merely an example, and the disclosure should not be limited thereto or thereby. As an example, at least one portion P2 among the portions P2 of the second protruding portions PR2, which are respectively adjacent to the second openings OP2, may have the radius of curvature that is different from that of other portions P2.

In plan view, the second opening OP2 may have a concave shape recessed to a direction away from the corner EG. The second opening OP2 may have the semi-oval shape in plan view. However, this is merely an example, and the shape of the second opening OP2 should not be limited thereto or thereby. As an example, the second opening OP2 may have a variety of shapes as long as the radius of curvature of the portion P2 of the second protruding portion PR2, which is adjacent to the second opening OP2, is smaller than the radius of curvature R of the curved portion.

According to a manufacturing method of the display device, the irradiating of the second laser beam may include substantially simultaneously patterning the panel protective film PPF and the second protective film PF2 disposed on the panel protective film PPF. In detail, the irradiating of the second laser beam LZ2 from the upper side of the second protective film PF2 may include substantially simultaneously patterning the panel protective film PPF and the second protective film PF2. Accordingly, the panel pattern portion PT and the second pattern portion PT2 may be substantially simultaneously formed on the panel protective film PPF and the second protective film PF2, respectively. The panel pattern portion PT may have a shape corresponding to a shape of the second pattern portion PT2.

FIGS. 11A to 11C show a structure in which the second pattern portions PT2 include six second protruding portions PR2 and five second openings OP2, however, the disclosure should not be limited thereto or thereby.

Figure 12A:
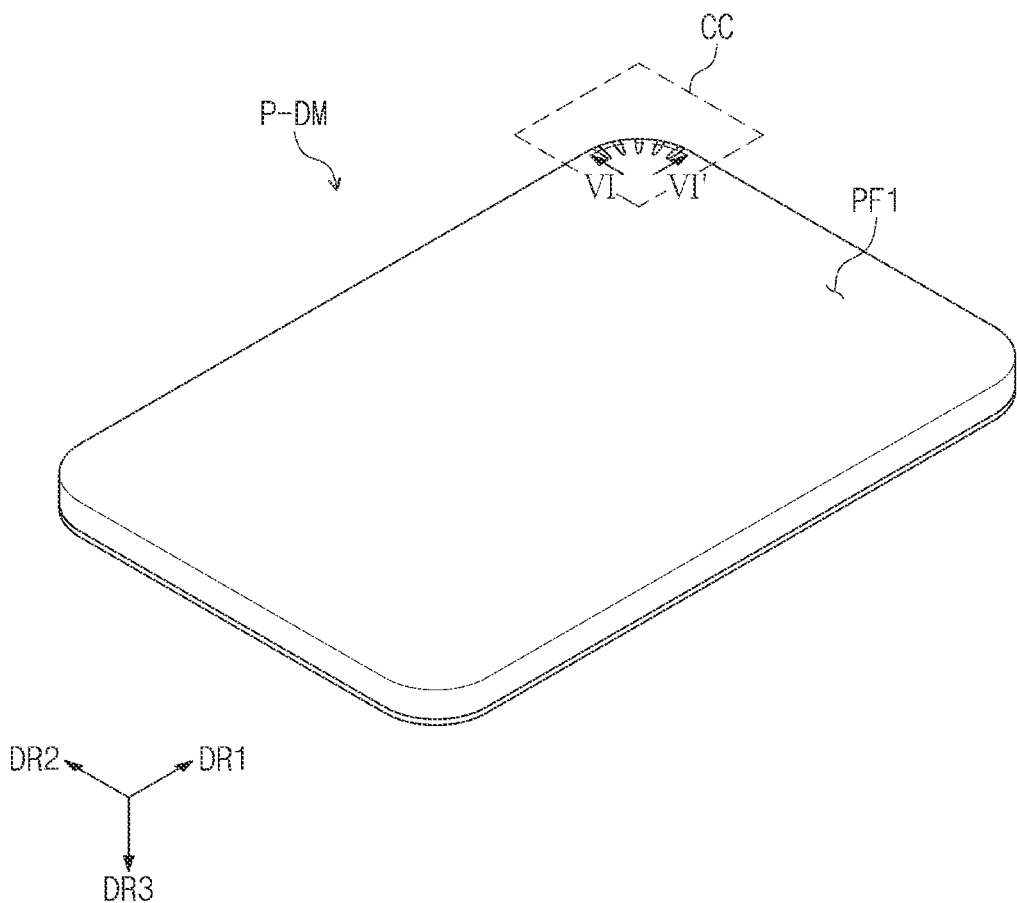
Figure 12B:
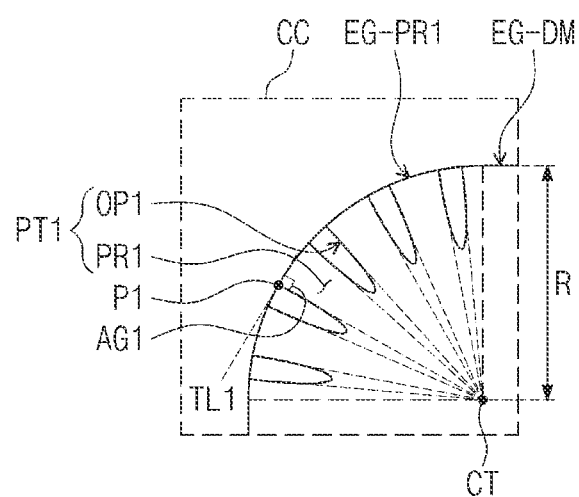
Figure 12C:
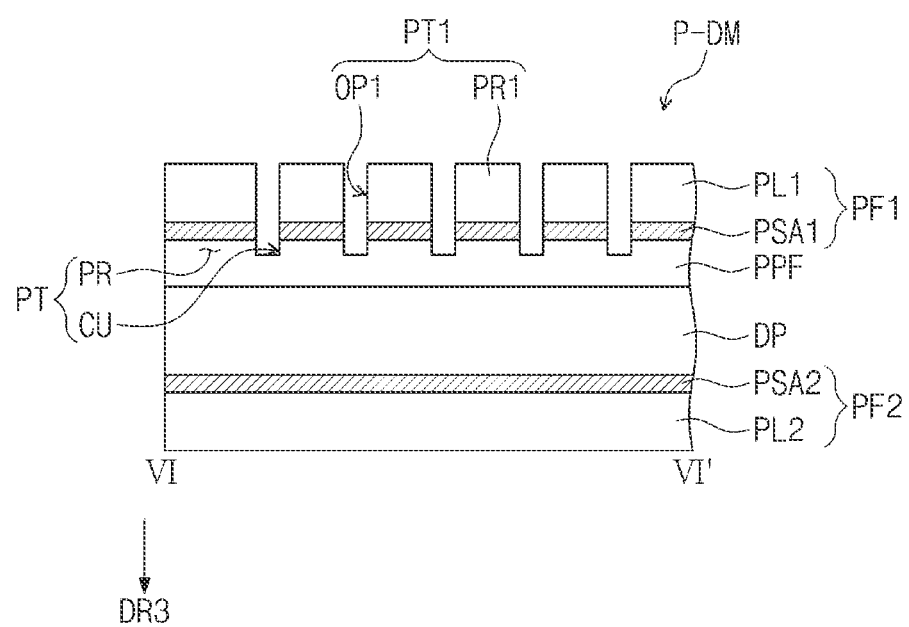

FIG. 12A is a perspective view of the preliminary display device including the first protective film in which the first pattern portion may be formed. FIG. 12B is an enlarged view of the preliminary display device including the first protective film in which the first pattern portion may be formed. FIG. 12C is a cross-sectional view of the preliminary display device including the first protective film in which the first pattern portion may be formed. FIG. 12B is an enlarged view of a portion CC shown in FIG. 12A. FIG. 12C is a cross-sectional view taken along line VI-VI' shown in FIG. 12A.

Referring to FIGS. 12A to 12C, the first protective film PF1 may include the first pattern portion PT1 disposed adjacent to the edge EG-DM of the curved portion. The first protective film PF1 may include the first pattern portions PT1 adjacent to the edge EG-DM of at least one curved portion among the curved portions. FIG. 12A shows the structure in which the first pattern portions PT1 are disposed adjacent to the edge EG-DM of the one curved portion, however, the disclosure should not be limited thereto or thereby. As an example, according to an embodiment, the first protective film PF1 may include the first pattern portions PT1 formed adjacent to the edge EG-DM of each of two or more curved portions.

The first pattern portions PT1 may include multiple first protruding portions PR1 and multiple first openings OP1. An edge EG-PR of each of the first protruding portions PR1 may correspond to the edge EG-DM of the curved portion. The first openings OP1 may be respectively defined between the first protruding portions PR1.

Each of the first protruding portions PR1 may include a portion that has the radius of curvature smaller than the radius of curvature R of the curved portion. The first protruding portions PR1 may include a portion P1 adjacent to the first opening OP1 and having the radius of curvature smaller than the radius of curvature R of the curved portion. For example, an angle AG1 between a tangent line TL1 of the portion P1 of the first protruding portion PR1, which is adjacent to the first opening OP1, and the first opening OP1 may be about 90 degrees. Accordingly, the radius of curvature of the portion P1 of the first protruding portion PR1, which is adjacent to the first opening OP1, may be converged to zero (0). However, this is merely an example, and the disclosure should not be limited thereto or thereby. As an example, under the condition that the radius of curvature of the portion P1 of the first protruding portion PR1, which is adjacent to the first opening OP1, is smaller than the radius of curvature R of the curved portion, the angle AG1 between the tangent line TL1 at the portion P1 of the first protruding portion PR1, which is adjacent to the first opening OP1, and the first opening OP1 may be smaller than about 90 degrees.

According to a manufacturing method of the display device, the first protruding portions PR1 may be formed such that the radius of curvature of the portion P1 adjacent to the first opening OP1 may be smaller than the radius of curvature R of the curved portion, and thus, the adhesion of the first protective film PF1 may be reduced. Accordingly, the panel protective film PPF may be prevented from being damaged in the removing of the first protective film PF1.

The first protruding portions PR1 may be formed such that radii of curvature of the portions P1 respectively adjacent to the first openings OP1 may be the same as each other. However, this is merely an example, and the disclosure should not be limited thereto or thereby. As an example, at least one portion P1 among the portions P1 of the first protruding portions PR1, which are respectively adjacent to the first openings OP1, may have the radius of curvature that is different from that of other portions P1.

In plan view, the first opening OP1 may have a concave shape recessed to a direction away from the corner EG. The first opening OP1 may have the semi-oval shape in plan view. However, this is merely an example, and the shape of the first opening OP1 should not be limited thereto or thereby. As an example, the first opening OP1 may have a variety of shapes as long as the radius of curvature of the portion P1 of the first protruding portion PR1, which is adjacent to the first opening OP1, is smaller than the radius of curvature R of the curved portion.

FIGS. 12A to 12C show a structure in which the first pattern portions PT1 include six first protruding portions PR1 and five first openings OP1, however, the disclosure should not be limited thereto or thereby.

Figure 13:
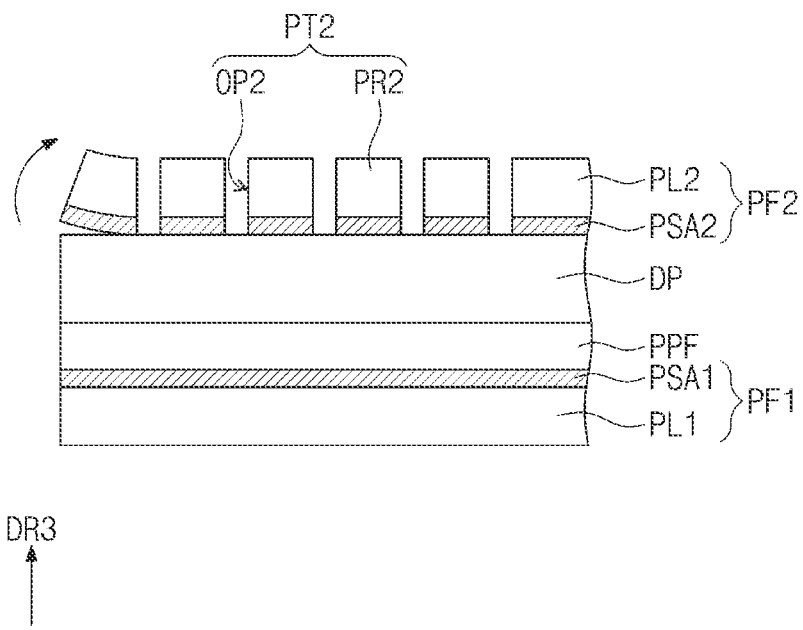
Figure 14:
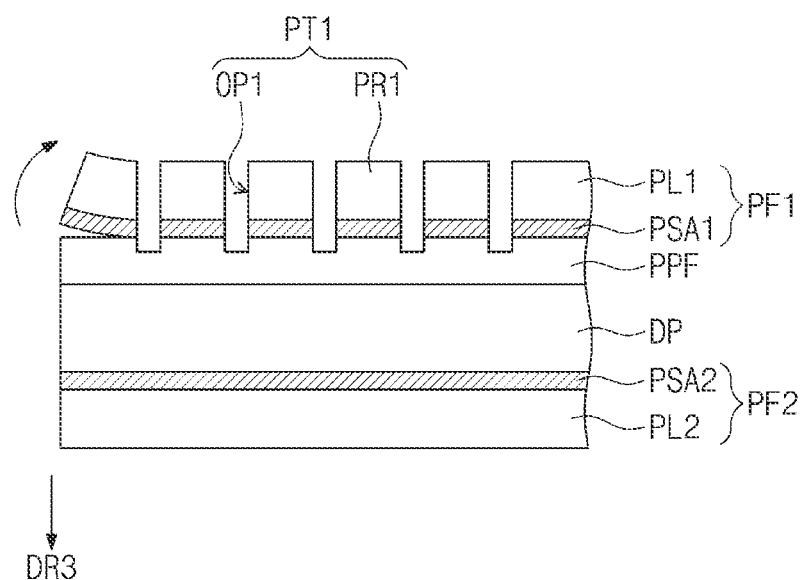

FIG. 13 is a view showing the removing of the second protective film. FIG. 14 is a view showing the removing of the first protective film.

Referring to FIG. 13, a manufacturing method of the display device may include the removing of the second protective film PF2. The second protective film PF2 may be removed from the display panel DP. According to a manufacturing method of the display device, as the second protective film PF2 includes the second pattern portions PT2 defined therein, the second protective film PF2 may have the low adhesion, and thus, the second protective film PF2 may be removed without damaging the display panel DP.

Referring to FIG. 14, a manufacturing method of the display device may include the removing of the first protective film PF1. The first protective film PF1 may be removed from the panel protective film PPF. According to a manufacturing method of the display device, as the first protective film PF1 includes the first pattern portions PT1 defined therein, the first protective film PF1 may have the low adhesion, and thus, the first protective film PF1 may be removed without damaging the panel protective film PPF.

As a manufacturing method of the display device includes the irradiating of the second laser beam to the portion adjacent to the edge of the curved portion from the upper side of the protective film, the pattern portions may be formed on the protective film. Due to the pattern portions formed on the protective film, the adhesion of the protective film disposed on the display panel or the adhesion of the protective film disposed on the panel protective film may be reduced. Accordingly, the display device may be manufactured without damaging the display panel and the panel protective film. The display device manufactured by a manufacturing method of the display device according to the disclosure may have excellent reliability. The display device manufactured by a manufacturing method of the display device according to the disclosure may include the panel pattern portions disposed on the panel protective film adjacent to the edge of the curved portion.

Although the embodiments of the disclosure have been described, it is understood that the disclosure should not be limited to these embodiments but various changes and modifications can be made by one of ordinary skill in the art within the spirit and scope of the disclosure as hereinafter claimed.

Therefore, the disclosed subject matter should not be limited to the embodiments described herein, but rather should include such changes and modifications within the spirit and scope of the disclosure.

What is claimed is:

1. A method of manufacturing a display device, comprising:
   providing a preliminary display device comprising a display panel, a panel protective film disposed under the display panel, and protective films disposed under the panel protective film and on the display panel;
   irradiating a first laser beam to the preliminary display device from an upper or lower side of the preliminary display device to form a curved portion at a corner of the preliminary display device;
   irradiating a second laser beam to the preliminary display device in which the curved portion is formed to form a pattern portion in at least one protective film of the protective films in a direction in which the first laser beam is irradiated; and
   removing the at least one protective film in which the pattern portion is formed.

2. The method of claim 1, wherein the pattern portion comprises:
   a plurality of protruding portions each comprising an edge corresponding to an edge of the curved portion; and
   a plurality of openings defined between the plurality of protruding portions.

3. The method of claim 2, wherein a portion of each of the plurality of protruding portions, which is adjacent to a corresponding opening, has a radius of curvature smaller than a radius of curvature of the curved portion in plan view.

4. The method of claim 2, wherein each of the plurality of openings has a concave shape recessed to a direction away from the corner in plan view.

5. The method of claim 1, wherein
   the irradiating of the first laser beam comprises irradiating the first laser beam to the at least one protective film, which is adjacent to the panel protective film, and the irradiating of the second laser beam comprises substantially simultaneously patterning the panel protective film and the at least one protective film disposed on the panel protective film.

6. The method of claim 5, wherein the patterned panel protective film comprises:
   a plurality of panel protruding portions; and
   a plurality of concave portions defined between the plurality of panel protruding portions.

7. The method of claim 6, wherein each of the concave portions has a concave shape recessed to a direction away from the corner in plan view.

8. The method of claim 1, wherein the at least one protective film comprises a protective layer and an adhesive layer disposed between the display panel and the protective layer.

9. The method of claim 1, wherein the display device comprises:
   a folding area folded with respect to a folding axis extending in a direction;
   a first non-folding area; and
   a second non-folding area spaced apart from the first non-folding area with the folding area interposed therebetween.

10. A method of manufacturing a display device, comprising:
    providing a preliminary display device comprising a first protective film, a panel protective film disposed on the first protective film, a display panel disposed on the panel protective film, and a second protective film disposed on the display panel;
    irradiating a first laser beam toward the display panel from an upper side of the second protective film to form a curved portion at a corner of the preliminary display device;
    irradiating a second laser beam toward the display panel from the upper side of the second protective film to form a pattern portion adjacent to an edge of the curved portion of the second protective film; and
    removing the second protective film in which the pattern portion is formed.

11. The method of claim 10, wherein the pattern portion comprises:
    a plurality of protruding portions each comprising an edge corresponding to an edge of the curved portion; and
    a plurality of openings defined between the plurality of protruding portions.

12. The method of claim 11, wherein each of the plurality of protruding portions comprises a part having a radius of curvature smaller than a radius of curvature of the curved portion.

13. The method of claim 11, wherein each of the plurality of openings has a concave shape recessed to a direction away from the corner in plan view.

14. The method of claim 10, wherein
    the first protective film comprises a first protective layer and a first adhesive layer disposed between the display panel and the first protective layer, and
    the second protective film comprises a second protective layer and a second adhesive layer disposed between the second protective layer and the panel protective film.

15. The method of claim 10, wherein
    the irradiating of the first laser beam comprises entirely cutting the preliminary display device in a thickness direction, and
    the irradiating of the second laser beam comprises cutting the second protective film in the thickness direction.

16. The method of claim 10, wherein the irradiating of the second laser beam comprises substantially simultaneously patterning the second protective film and the panel protective film.

17. A display device comprising:
    a display panel and a panel protective film disposed under the display panel, the display panel and panel protective film including a plurality of curved portions disposed at a plurality of corners, wherein
    the panel protective film comprised a plurality of panel pattern portions adjacent to an edge of at least one curved portion among the plurality of curved portions,
    the plurality of panel pattern portions comprise:
      a plurality of panel protruding portions; and
      a plurality of concave portions defined between the plurality of panel protruding portions, and
    each of the plurality of panel protruding portions comprises a part with a radius of curvature smaller than a radius of curvature of the curved portion, and
    an edge of each of the plurality of panel protruding portions corresponds to an edge of the display panel.

18. The display device of claim 17, wherein plurality of panel protruding portions, which are adjacent to the plurality of concave portions, have a same radius of curvature.

19. The display device of claim 17, wherein
    the edge of each of the plurality of panel protruding portions corresponds to the part of the plurality of panel protruding portions with a radius of curvature smaller than a radius of curvature of the curved portion, and
    each of the plurality of concave portions extend to the edge of the curved portion.

20. The display device of claim 17, wherein each of the plurality of concave portions has a concave shape recessed to a direction away from a corner in plan view.

21. The display device of claim 17, further comprising:
    a folding area folded with respect to a folding axis that is an imaginary line extending in a direction;
    a first non-folding area; and
    a second non-folding area spaced apart from the first non-folding area with the folding area interposed therebetween.

22. The display device of claim 17, wherein each of the plurality of panel protruding portions comprises a part being adjacent to a concave portion and having a radius of curvature smaller than a radius of curvature of the at least one curved portion.

* * * * *